United States Patent Office 3,563,711
Patented Feb. 16, 1971

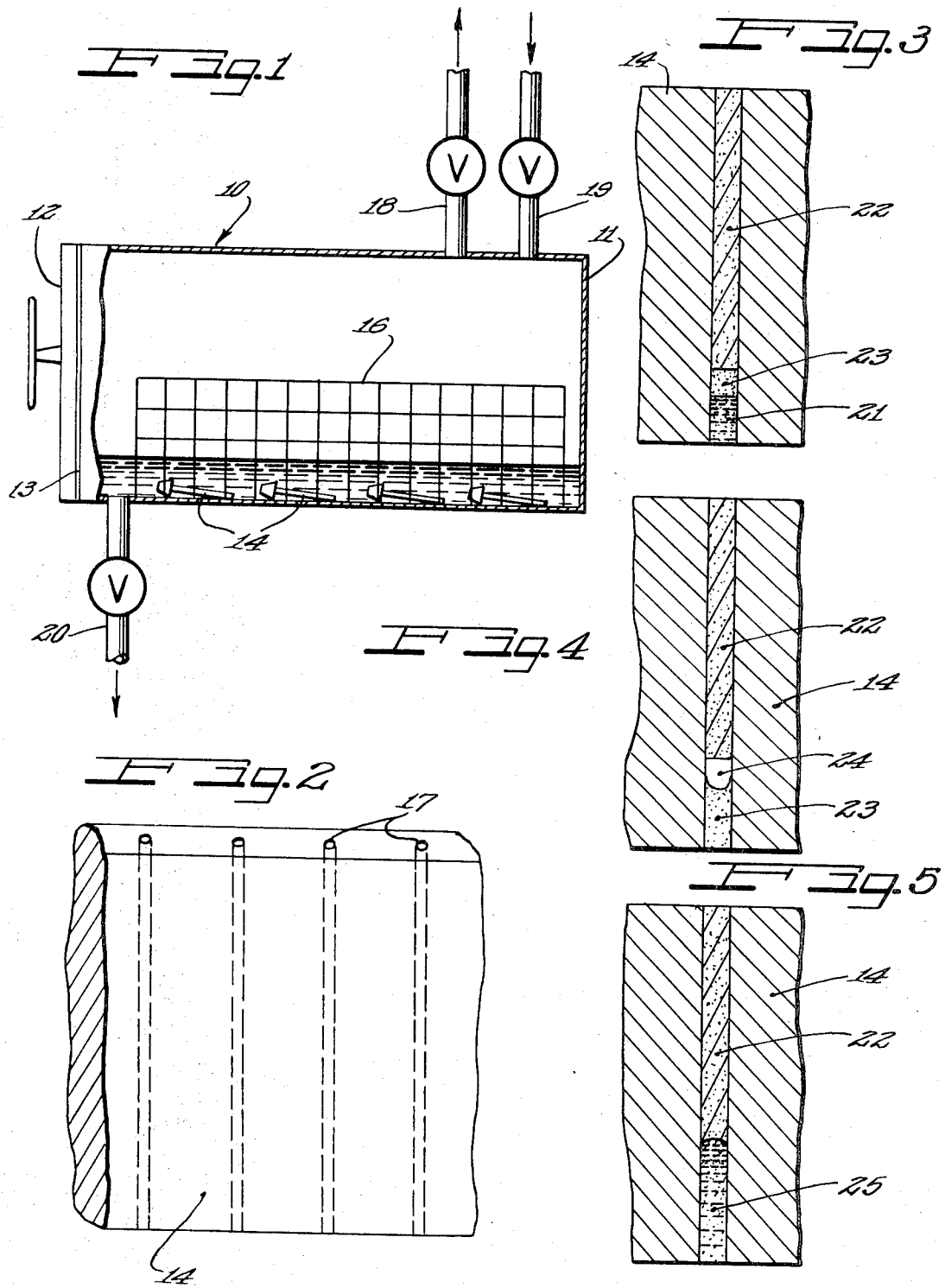

3,563,711
PROCESS FOR REMOVAL OF SILICEOUS CORES
FROM CASTINGS
Charles M. Hammond, Alliance, Ronald D. Markle,
Minerva, and Robert E. McCracken, Louisville, Ohio,
assignors to TRW Inc., Cleveland, Ohio, a corporation
of Ohio
Filed July 18, 1968, Ser. No. 745,769
Int. Cl. B01d 11/02; G01b 33/32
U.S. Cl. 23—312                                          9 Claims

ABSTRACT OF THE DISCLOSURE

Process for the removal of a siliceous core from a metal casting which involves placing the casting in a closed vessel, introducing an aqueous caustic alkali solution into the vessel capable of dissolving the core, heating the alkali solution to a temperature for maximum rate of removal but not high enough to attack the casting, thereafter reducing the pressure to induce boiling of the solvent material trapped in the passages in which the core has been partially dissolved by the solution, and repressurizing the vessel, and then repeating the steps of reducing and increasing the ambient pressure until the core is completely dissolved from the casting, the induced boiling and recondensation serving to remove and replace spent leaching solution in the small cored passages.

BACKGROUND OF THE INVENTION

Field of the invention

This invention is in the field of removing ceramic cores particularly cores having very small cross-sections from metal castings of the type produced, for example, by precision investment casting processes.

DESCRIPTION OF THE PRIOR ART

The provision of hollow passages in precision investment castings usually makes use of cores composed of ceramic aggregates which are either preformed or formed along with the shell mold itself. Such ceramic aggregate cores, of relatively large cross-section, are not particularly difficult to remove with caustic solutions or the like. However, with the requirement for very small passages in castings such as exists, for example, in the field of cooling passages in airfoils of turbine blading, the use of solid ceramic cores such as glass, fused silica, very thin ceramic aggregates, and the like has become predominant. Removal of these cores from the casting, however, has posed a major problem. Whereas the large cross-sectioned ceramic aggregate cores could be leached out and the remaining ceramic particles could be removed as a sludge, a fused silica core, or small cross-sectioned ceramic core, cannot be completely removed by this technique. This is due to the fact that the solution rates obtained through the use of conventional leaching processes are prohibitively slow. It has been found necessary to use water based solutions of caustic material at elevated temperatures to remove the fused silica and small cross-sectioned ceramic cores, requiring pressure vessels operating under severe conditions. These conditions frequently promoted attack on the surface of the casting, sometimes of a very severe nature. They also required the use of expensive and relatively massive equipment which represented a substantial capital expenditure.

SUMMARY OF THE INVENTION

The present invention provides an improved process for leaching out siliceous cores, particularly thin cores from metal castings, while operating at relatively low temperatures. In essence, the process comprises inducing boiling and recondensation of the leaching solution to remove and replace spent leaching solution in the small cored passages to the end that complete removal of the core material is effected. Whereas the prior processes for removal of fused siliceous cores operated at a minimum of about 400° F. and were frequently higher, the process of the present invention can operate successfully at temperatures of no more than 400° F. and can be as low as 275° F. This significant difference in temperature has been found to substantially reduce surface attack on the casting. In addition, because of the less stringent temperature and pressure requirements of the present invention, less elaborate and less expensive equipment can be used in this practice.

BRIEF DESCRIPTION OF THE DRAWING

FIG. 1 is a somewhat schematic view of an autoclave assembly which can be used in the practice of the present invention;

FIG. 2 is a greatly enlarged fragmentary view of a portion of an airfoil of a turbine blade showing the hollow passages formed therein by fused silica cores;

FIG. 3 is a greatly enlarged fragmentary cross-sectional view of the vicinity of one of the passages during the leaching operation;

FIG. 4 is a view similar to FIG. 3 but illustrating the manner in which vapor bubbles are formed during the leaching process of the present invention; and FIG. 5 is a view similar to FIGS. 3 and 4, but showing the manner in which additional amounts of the leaching solution are drawn into the hollow passage after expulsion of the leaching solution as shown in FIG. 4.

DESCRIPTION OF THE PREFERRED EMBODIMENTS

In the first step of the improved method, the castings with the siliceous core passages, either of fused silica or ceramic aggregate, in them are placed in a pressure vessel such as an autoclave and a vacuum is established in the vessel bringing the absolute pressure down to about 10 millimeters of mercury or less. This serves to remove all the air from filled or partially filled core passages. Then, a leaching solution which can be a solution of an alkali metal hydroxide at a concentration of about 20% to 50% by weight, preferably a 20% solution of sodium hydroxide, is pumped into the evacuated vessel to fully cover the castings. The preferred sodium hydroxide concentration is 20 to 40% by weight, while for potassium hydroxide it is 30 to 50% by weight. Then, the contents of the pressure vessel are heated to a temperature on the order of 275 to 325° F. and preferably at 300° F. until the internal pressure in the vessel due to the volatilization of the water therein reaches a value of about 60 to 90 pounds per square inch gauge, and preferably about 75 pounds per square inch gauge. It should be noted that the temperature employed in leaching can be as high as 450° F., with correspondingly higher pressures if the casting is of a metal which can resist caustic attack at these conditions. In any event, the temperatures employed in the new process are less than would be required with conventional leaching procedures.

The atmosphere in the vessel at this time is saturated with mostly water vapor in equilibrium with the non-volatilized water remaining in the leaching solution. Then, vapor is released from the unit until such time as the internal pressure drops down to a value of about 40 to 60 pounds per square inch gauge, or the vapor pressure associated with that particular temperature of operation. This release of vapor and the resulting lowering of the internal pressure induces boiling of the liquid which has worked its way into the core passages. Then, the pressure in the unit is again raised to a value of about 60 to 90 pounds per square inch, typically 75 pounds per square inch, using a high pressure inert gas such as argon, helium or the like which will not attack the surface of the castings. This raising of the internal pressures terminates the boiling action. The sequential steps of venting and repressurizing are repeated periodically until such time as all of the siliceous core material has been removed out of the core passages. Then, the unit can be emptied and the parts washed to remove the last traces of products or reaction and leaching solution.

Referring to the drawings, reference numeral 10 has been applied to an autoclave embodying a tank 11 closed by means of a door 12 and being provided with a sealing gasket 13 between the door 12 and the tank 11. The articles to be treated which in the illustrated form consist of a turbine blade 14 having silica cores therein placed in a wire basket 16. As illustrated in FIG. 2, the silica cores are used to provide hollow passages 17 in the finished blading.

The autoclave 10 is provided with a valved outlet 18 for venting vapors from the autoclave to thereby induce boiling of the solution, and a valved inlet 19 for introducing the pressurized gas atmosphere into the autoclave during the repressurizing step. A liquid outlet conduit 20 is also provided to drain spent leaching solution from the autoclave 10 at the completion of the treatment.

After the leaching has been going on for some time, the leaching solution 21 (FIG. 3) has dissolved some of the siliceous core 22 to produce reaction products 23 consisting mainly of silicates at the interface between the solution 21 and the core 22. As this layer of reaction products 23 builds up the process would normally slow down or stop because fresh leaching medium cannot reach the silica. This problem is particularly severe because of the geometry of the cored holes. The small holes act as capillary tubes, making it extremely difficult to transport the reaction products away from the interface and move fresh solution into the interface.

In the process of the present invention, the reaction products are agitated and removed by a boiling caused by the reduction in ambient pressure as previously described. This results in the formation of a vapor bubble 24 in the cored passage, forcing the reaction products 23 in the spent leaching solution out of the hole. Then, when the vapor bubble 24 has collapsed from repressurizing, fresh solution 25 is pulled into the hole as illustrated in FIG. 5 of the drawings. This flushing of spent leaching solution and reaction products is repeated until such time as the entire core 22 is removed from the casting, leaving the passages 17 therein.

EXAMPLE

The process of the present invention was applied to castings consisting of turbine vanes containing twenty-five holes formed by fused silica cores. Twenty of the holes were approximately 0.030 inch in diameter and 2.25 inches long. Five of the holes were of rectangular cross-section with dimensions of approximately 0.030 inch by 0.060 inch by 2.25 inches.

The castings were placed in an autoclave in baskets, and a vacuum was established in the vessel using a mechanical pump pumping for twenty minutes. The leaching solution consisting of 20% sodium hydroxide in water was pumped into the evacuated vessel fully covering all the castings. The unit was heated to 300° F. to provide an internap pressure of about 75 pounds per square inch gauge. Vapor was released from the unit for two minutes, dropping the pressure to 50 pounds per square inch gauge. This induced boiling in the holes of the casting. The pressure in the unit was then raised to 75 pounds per square inch gauge, using a blanket of high pressure argon. This repressurizing stopped the boiling action. The vent and repressurizing cycles were repeated every thirty minutes for a total of twelve hours. After twelve hours at that temperature, the unit was emptied and the parts were washed with water. This sequence of operation can be repeated any number of times to secure complete removal of the silica cores from within the castings.

After the core removal was completed, the caustic solution was removed from the vessel and clean water was added. The water temperature was increased to about 300° F. and boiling was induced every 15 to 30 minutes to remove traces of residual caustic.

From the foregoing, it will be understood that the process of the present invention can be operated at relatively low temperatures on the order of 300° F. or so as compared with other autoclave processes for water removal which operate at 400° F. or higher. This lower temperatures reduces the amount of attack on the casting surface. The castings referred to in the specific example given above showed no surface attack, whereas conventional processing can produce severe attack. Furthermore, the low temperatures and corresponding low pressures reduce the equipment requirements substantially as compared to prior techniques.

It should be evident that various modifications can be made to the described embodiments without departing from the scope of the present invention.

We claim as our invention:

1. In a method of removing a siliceous core from a metal casting which comprises the steps of placing the casting in a confined pressure vessel, introducing from about 20 to 50% by weight aqueous caustic alkali solution of an alkali metal hydroxide selected from the group consisting of sodium hydroxide and potassium hydroxide into said vessel in an amount sufficient to cover said casting, the improvement comprising (1) heating the contents of said vessel to a temperature above the boiling point of said solution and sufficient to create a superatmospheric pressure within said vessel, (2) releasing vapors from said vessel to reduce the pressure therein sufficient to induce boiling of material trapped in passages in which said core has been partially dissolved by said solution, (3) pressurizing said vessel with a gas atmosphere to a pressure sufficient to terminate the boiling action, and (4) repeating steps (2) and (3) in sequence until the core has been completely removed from within said casting.

2. The method of claim 1 in which said contents are heated to a temperature not in excess of 400° F.

3. The method of claim 1 in which said contents are heated to a temperature of about 300° F.

4. The method of claim 1 in which said superatmospheric pressure is on the order of 60 to 90 pounds per square inch gauge.

5. The method of claim 1 in which said pressure in step (2) is reduced to a value on the order of 40 to 60 pounds per square inch gauge.

6. The method of claim 1 in which said gas atmosphere in step (3) is an inert gas atmosphere.

7. The method of claim 1 in which said caustic alkali solution is a 20 to 40% by weight solution of sodium hydroxide.

8. The method of claim 6 in which said gas atmosphere in an atmosphere of argon.

9. The method of claim 1 in which air is evacuated from said vessel before said aqueous caustic alkali solution is introduced therein.

References Cited

UNITED STATES PATENTS

| | | | |
|---|---|---|---|
| 757,718 | 4/1904 | Bijur | 164—132X |
| 2,362,875 | 11/1944 | Zahn | 164—132 |
| 2,502,337 | 3/1950 | Moir | 164—132X |
| 2,597,896 | 5/1952 | Oster | 134—17 |
| 2,609,576 | 9/1952 | Roush | 164—132 |
| 2,709,643 | 5/1955 | Perry | 23—267 |
| 2,812,562 | 11/1957 | Dalton | 164—132 |
| 2,872,296 | 2/1959 | Lemon | 23—267X |
| 3,011,233 | 12/1961 | Kirtchik | 164—132X |
| 3,218,684 | 11/1965 | Spink | 164—132 |
| 3,311,956 | 4/1967 | Townsend | 164—132X |
| 3,473,599 | 10/1969 | Rose | 164—132X |

FOREIGN PATENTS

| | | | |
|---|---|---|---|
| 21,036 | 11/1929 | Netherlands | 23—267 |
| 1,207,556 | 12/1965 | Germany | 164—132 |

NORMAN YUDKOFF, Primary Examiner

S. J. EMERY, Assistant Examiner

U.S. Cl. X.R.

23—110; 134—17; 164—132; 148—2